(12) United States Patent
Doppstadt

(10) Patent No.: US 9,295,194 B2
(45) Date of Patent: Mar. 29, 2016

(54) APPARATUS FOR CLEANING FIELD CROPS

(71) Applicant: USG UMWELTSERVICE GmbH & CO. KG, Velbert (DE)

(72) Inventor: Ferdinand Doppstadt, Velbert (DE)

(73) Assignee: USG UMWELTSERVICE GMBH & CO. KG, Velbert (DE)

( * ) Notice: Subject to any disclaimer, the term of this patent is extended or adjusted under 35 U.S.C. 154(b) by 0 days.

(21) Appl. No.: 14/498,562

(22) Filed: Sep. 26, 2014

(65) Prior Publication Data

US 2015/0014226 A1     Jan. 15, 2015

(30) Foreign Application Priority Data

Mar. 30, 2012   (DE) .......................... 10 2012 102 763
Mar. 22, 2013   (WO) ................. PCT/DE2013/100113

(51) Int. Cl.
*A01D 33/08*  (2006.01)
*A23N 12/02*  (2006.01)
*B07B 1/24*   (2006.01)
*B07B 1/22*   (2006.01)
*B07B 1/26*   (2006.01)
*B03B 7/00*   (2006.01)

(52) U.S. Cl.
CPC .............. *A01D 33/08* (2013.01); *A23N 12/023* (2013.01); *B03B 7/00* (2013.01); *B07B 1/22* (2013.01); *B07B 1/24* (2013.01); *B07B 1/26* (2013.01)

(58) Field of Classification Search
CPC ..... A23N 12/02; A23N 12/023; A23N 12/00; A01D 33/08; B07B 1/24; B07B 1/22
See application file for complete search history.

(56) References Cited

U.S. PATENT DOCUMENTS 1,736,813 A * 11/1929 Zuckerman ..................... 15/3.15
2,195,371 A *  3/1940 Moore ............................. 34/95
6,360,894 B1 * 3/2002 Devlin et al. ................. 209/291

FOREIGN PATENT DOCUMENTS

| DE | 1298769 B    | 7/1969  |
| DE | 1607629 B1   | 5/1972  |
| DE | 3717170 A1   | 12/1988 |
| DE | 19714181 A1  | 10/1998 |
| EP | 0041226 A1   | 12/1981 |
| FR | 1127850 A    | 12/1956 |
| FR | 2362569 A1   | 3/1978  |
| NL | 6515105 A    | 5/1967  |

OTHER PUBLICATIONS

European Patent Office Action dated Nov. 9, 2015 for Application No. 13718779.5.

* cited by examiner

*Primary Examiner* — Luis A Gonzalez
(74) *Attorney, Agent, or Firm* — Lawrence G. Fridman, Esq.

(57) ABSTRACT

A cleaning apparatus is provided for cleaning crops, such as potatoes or beets, with adhering particles of soil and the like. The apparatus comprises a charging and or supply hopper with an opening at its underside from which the crops enter for cleaning; a housing with a cleaning region, wherein the crops are cleaned; a rotating screen drum rotating about an axis of rotation wherein the crops are cleaned; wherein the screen drum is arranged in the cleaning region; the axis of rotation of the rotating screen drum is inclined at an acute angle.

11 Claims, 2 Drawing Sheets

APPARATUS FOR CLEANING FIELD CROPS

RELATED APPLICATIONS

THIS APPLICATION IS A CONTINUATION OF PCT APPLICATION NO. PCT/DE2013/100113 FILED MAR. 22, 2013 WHICH CLAIMS PRIORITY OF GERMAN PATENT APPLICATION DE 10 2012 102 763.3 FILED MAR. 30, 2012, BOTH APPLICATIONS ARE HEREBY INCORPORATED IN THEIR ENTIRETY BY REFERENCE.

FIELD OF THE INVENTION

The invention relates to cleaning machinery in general, and more specifically it relates to an apparatus for cleaning crops, such as for example, potatoes beets, etc.

BACKGROUND OF THE INVENTION

Crops such as potatoes or beets are cleaned from adhering soil after they were harvested on the field. For this purpose, suitable cleaning apparatuses are used. Machines are known, which are equipped with a charging and supply hopper serving as a collecting container and having an opening at its bottom. From the opening the crops arrive on a transport device for cleaning. The crops are transported by the transport device into a cleaning region. In particular brushes clean the crops in the cleaning region from soil adhering to them.

German utility model DE 20 2005 004 507 U1 discloses a brush-washing and polishing machine for crops. The device described therein for cleaning crops consists of a plurality of brush rollers forming a transportation path. The brush rollers are drivable in rotation and are arranged one after another in a direction of passage of the crops. In a starting position the brush rollers are arranged in one common horizontal plane. This brush-washing and polishing machine for crops is very elaborate in manufacture and also in subsequent maintenance. If one brush roller becomes inoperative, either a crop jam or an imbalanced onward transport occurs, which can lead to a blockage of the machine because the crops are no longer transported.

German patent publication DE 197 14 181 A1 describes a device for cleaning of fruits, particularly crops such as beets. This device for cleaning of fruits comprises a substantially cylindrical or polygonal housing with two housing end walls. Preferably the beet feeding device and the beet discharging device are combined, wherein a fruit support device is arranged in the interior of the housing and is substantially extending over the entire axial length of the housing. The fruit support device is constructed of at least two brush rollers arranged parallel and closely adjacent. At least two brush rollers are designed so that they serve for support, transport and cleaning of the fruit. In this device fruits to be cleaned come to lie on the brushes and are cleaned by them. Therefore, the transport plane of the fruit is above the plane in which the transport and cleaning brushes are arranged. The cleaning pressure loaded on the fruits is determined only by the weight of the fruit. The fruits are rotated by the rotation of the brushes and consequently cleaned on all sides.

German Patent Application 1,607,629 published for opposition teaches a device for washing and cleaning sugar beets. The system includes a drum in which the sugar beets supplied via a conveyor belt are first soaked, and a cleaning grid with spray nozzles arranged above it. The waste water arising below the first portion of the grid is discharged, while the already much cleaner water arising under the second region of the grid is fed to the drum again by a pump. The drum is rotatable about its horizontally arranged longitudinal axis by means of a non-illustrated drive, and is provided at its inner periphery with inserts in the form of a single- or multi-start screw. The screw flights comprise holes through which a uniform water level can be reached in each single cell formed at the bottom of the drum between two turns. The low stirring bars disposed on the inner periphery turn-over the cell contents. The discharge end of the drum is provided with a number of vanes which form an inner scoop wheel. In the region of this discharge end of the drum, the drum periphery comprises holes through which the water can run off. A transport channel protrudes into the discharge end of the drum formed as inner scoop wheel. The transport channel supplies the beets to the grid.

Among the disadvantages of known cleaning apparatuses are that their transportation systems for the crops constructed in very complicated and failure-prone manner. In particular, the brush rollers form the transport system and the cleaning system at the same time. This leads to increased wear of the brush rollers, because such brush rollers are constantly exposed to the pressure of the crops positioned above.

SUMMARY OF THE INVENTION

One aspect of the present invention relates to a cleaning apparatus for cleaning crops, such as potatoes or beet, etc. on which soil and the like adhere.

The cleansing apparatus comprises a charging and/or supply hopper with an opening at its underside from which the crops enter for cleaning, a housing with a cleaning region, in which the crops are cleaned, and a rotating screen drum rotating about an axis of rotation in which the crops are cleaned, wherein the screen drum is arranged in the cleaning region.

Another aspect of the invention provides an apparatus for cleaning crops, wherein the axis of rotation of the rotating screen drum is inclined at an acute angle.

The cleaning apparatus according to the invention has the advantage that the crops in the screen drum initially has to move against the force of gravity. This results in a movement among each other. The crops rub against each other during the transport in the screen drum so that the soil is optimally separated by the rubbing in the screen drum. Strong brushing is no longer required. In particular, this inventive feature results in that the soil is released from the crops with less energy expenditure. In doing so, the acute angle of the screen drum should be chosen so that the rubbing of the screen drum is sufficient to transport the crops in the screen drum against gravity.

In a preferred embodiment of the cleaning apparatus of the invention, transport means is provided for the movement of the crops in the screen drum. Preferably, the transport means is formed as helical guides in the screen drum. This feature ensures that a direction is specified in the screen drum for the crops to be cleaned, not only for entering the drum, but also for leaving the drum without destroying the crops by too much force. The transport means can be, for example, configured as grooves or guides helically running along the inner wall of the screen drum. Barriers, bumps, brushes or the like on or in the guides may increase the rubbing effects of the crop to each other, which are already given by the inclination of the screen drum. Said means act in such a way that the crops obtain an additional motion relative to each other.

In another embodiment of the cleaning apparatus of the invention the inclination of the rotation axis of the rotating screen drum is variably adjustable. In doing so, the screen drum can always be adjusted to the crops, i.e. for example to the diameter or weight of the crops, so that sufficient friction is present for the transport of the crops within the screen drum. In this way it can be ensured that there is no congestion in the screen drum because, for example, the gravitational force is greater than the frictional force of the screen drum in the screen drum. For this purpose it is only necessary to set the inclination of the screen drum accordingly.

In a further embodiment of the inventive cleaning apparatus for cleaning crops a brush arrangement is provided, which comprise a brush roller. The brush roller comprises a shaft which is mounted in the cleaning apparatus above the conveyor belt extending at an acute angle and is driven by a drive. The brush means designed as a brush roller actively clean the crops in this way. The brush roller is located on a shaft which is driven by an own drive in rotation. By this rotation, the bristles of the brush roller actively rub the earth from the crops. The crops can pass the brush roller transported by a conveyor belt. Preferably the brush means include two brush rollers, which are driven inside the cleaning apparatus by a drive in an opposite direction of rotation. By the use of more than one brush roller, the cleaning by the bristles is intensified. If there are two brush rollers arranged with opposite directions of rotation, then there is an additional and enhanced cleaning effect produced.

In still another embodiment of the cleaning apparatus of the invention a spraying device with one or more high-pressure nozzles is provided in the cleaning region, which cleans the crops with water under high pressure. The soil is washed away by the water. The high pressure of the water, which impinges on the crops, has the effect that even persistent soil residues are dissolved.

In still further embodiment of the cleaning apparatus of the invention the spraying device comprises a pivotable pressure nozzle for obtaining a uniform cleaning. The pivotable pressure nozzle cleans the crops with water under high pressure. In doing so, the pivoting of the high-pressure nozzle can be carried out manually or preferably automatically. This allows a consistent detachment of soil from all crops. In addition, the number of high-pressure nozzles can be reduced by pivotable nozzles. For pivoting, the high-pressure nozzles can be, for example, guided along a motion link. For this purpose a suitable drive can be provided.

For obtaining additional and effective cleaning effects with the cleaning apparatus according to the invention, a shaker device is provided for shaking the crops. This shaker device effects that adhering soil is loosened and dissolved.

In an advantageous embodiment of the invention a screen is provided for screening soil and the like for the separation of soil from the crops. The screen should be designed so that the soil falls through the meshes and the crops remain lying on them.

In a particular embodiment of the cleaning apparatus of the invention the cleaning apparatus is adapted as a mobile trailer for a tractor unit. Such a cleaning apparatus can be comfortably transported to the crops in order to clean the crops at the place of manufacture which is the field. This saves space and weight, as the crops have already been cleaned for subsequent processing. Thus, for example, the transportation costs are lower.

In another particular embodiment of the cleaning apparatus of the invention a water-filled cleaning basin is provided through which the crops are transported by a conveyor belt for cleaning. In doing so, soil is additionally detached from the crops and, in particular, the aforementioned cleaning mechanisms are supported.

In a further particular embodiment of the cleaning apparatus for cleaning crops, such as potatoes or beets, the screen drum is arranged above a water collecting basin. The detached soil falls into the water collecting basin and, dissolved in the water, can be easily transported.

Thus, the invention provides an effective cleaning apparatus which avoids the disadvantages of prior art and provides a simple transport system for crops which is less failure-prone.

DETAILED DESCRIPTION OF THE INVENTION

Figure 1:
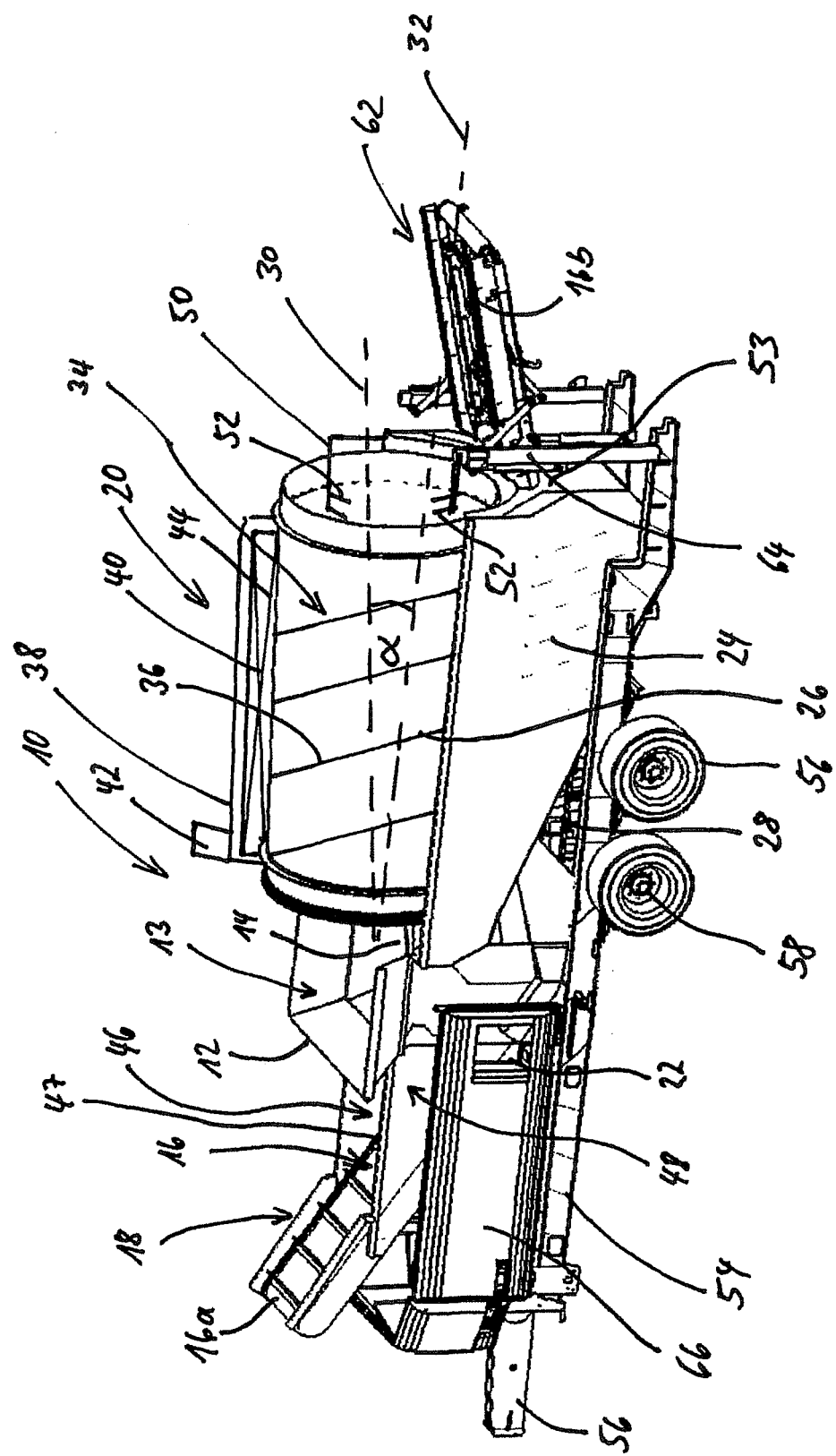
FIG. 1 is a semi-perspective view of the mobile cleaning apparatus of the invention.

In FIG. 1, the numeral 10 designates a cleaning apparatus for cleaning crops, such as potatoes and beet, on which in particular soil and the like adhere. The cleaning apparatus 10 includes a charging and supply hopper 12. The charging and supply hopper 12 comprises an opening 13 on its bottom 14 from which the crops enter the cleaning process. For this purpose a conveyor belt 16 of a conveyor device 18 extends below the opening 13 of the charging and supply hopper 12. The crops to be cleaned are transported into and out of a cleaning region 20 by the conveyor belt 16. The conveyor device 18 may consist of one or more conveyor belt segments 16a and 16b arranged in series and/or in parallel. In this case a drive 22 of the conveyor device 18 drives the respective conveyor belts 16 for conveying the crops. The cleaning region 20 comprises a housing 24. The housing 24 serves both to protect against external influences, and, with a suitable insulation, especially as a noise protection.

The cleaning apparatus 10 comprises a screen drum 26 for screening out soil and the like. The screen drum 26 is driven for rotation about its axis of rotation 30 by a drive 28. The screen drum 26 is disposed at an acute angle $\alpha$, that is, the rotation axis 30 is located in the acute angle a with respect to a horizontal longitudinal axis 32. The acute angle has the effect that the crops are moved against gravity through the screen drum 26. Thus, the crops are rubbing each other and to some extent with the screen drum 26. This supports the release of adhering soil from the crops.

The acute angle $\alpha$ of the screen drum 26 is variable in the present cleaning apparatus, i.e. adjustable, and can therefore be accordingly adapted to the size and the weight of the crops. If the meshes of the screen drum 26 are not sufficient to detach the soil, the relative movement of the crops to each other is, if necessary, amplified by bumps and barriers in the screen drum. In doing so, the crops are not only transported through the screen drum 26, but have to overcome additional resistance, at which the soil can be dissolved.

The crops are transported by the conveyor device 18 into the screen drum 26 for cleaning. Thus, in the beginning the crops must run against the force of gravity when passing through the screen drum 26. Due to the rotation within the screen drum 26, soil residues are detached from the crops and fall through the meshes of the screen drum 26.

Transport means 34 is provided in the screen drum 26. The transport means 34 supports the crops to pass through the screen drum 26. The transport means 34 is formed as spiral guides 36 in the present embodiment. The spiral guides 36 are preferably rail-like projections which are provided on the inside wall of the screen drum 26. They specify the axial direction for the crops during rotation of the screen drum 26.

Furthermore, brush means 38 is provided in the cleaning region 20. The brush means 38 comprises a rotating brush 40 which is provided with a mounted shaft. The brush roller 40 is driven by a drive 42 to rotation. Bristles 44 of the brush roller 40 can be designed with different hardness and length in order to obtain certain cleaning effects. The brush roller 40 pivotably abuts on the screen drum 26 from the outside. In particular, it dissolves soil and the like adhering to the screen drum 26 from the meshes of the screen drum 26. If necessary, the brush roller 40 may be arranged within the screen drum 26 for immediate cleaning of the crop.

An optional shaker device 46 which is provided on the conveyor belt segment 16*a*, also supports the detachment of persistently adhering soil from the surface of the crops by shaking the crops. The shaking device 46 may include a screen 47, through which a part of the adhering soil drops down.

Furthermore, a water-filled cleaning basin 48 through which the crops are transported by the conveyor device 18 for cleaning additionally supports the cleaning procedure.

A spraying device 50 having a plurality of high pressure nozzles 52 is provided in the cleaning region 20. Thereby, the crops are cleaned in the cleaning region 20 with water under high pressure. The high-pressure nozzles 52 are pivotable. As a result, the water jet of one high-pressure nozzle 52 can cover a larger surface or a larger region for cleaning the crops. The screen drum 26 is arranged above a water collecting basin 53. Thus, the detached soil falls into the collecting basin 53. Dissolved in the water it can be easily removed and cleaned.

Figure 2:
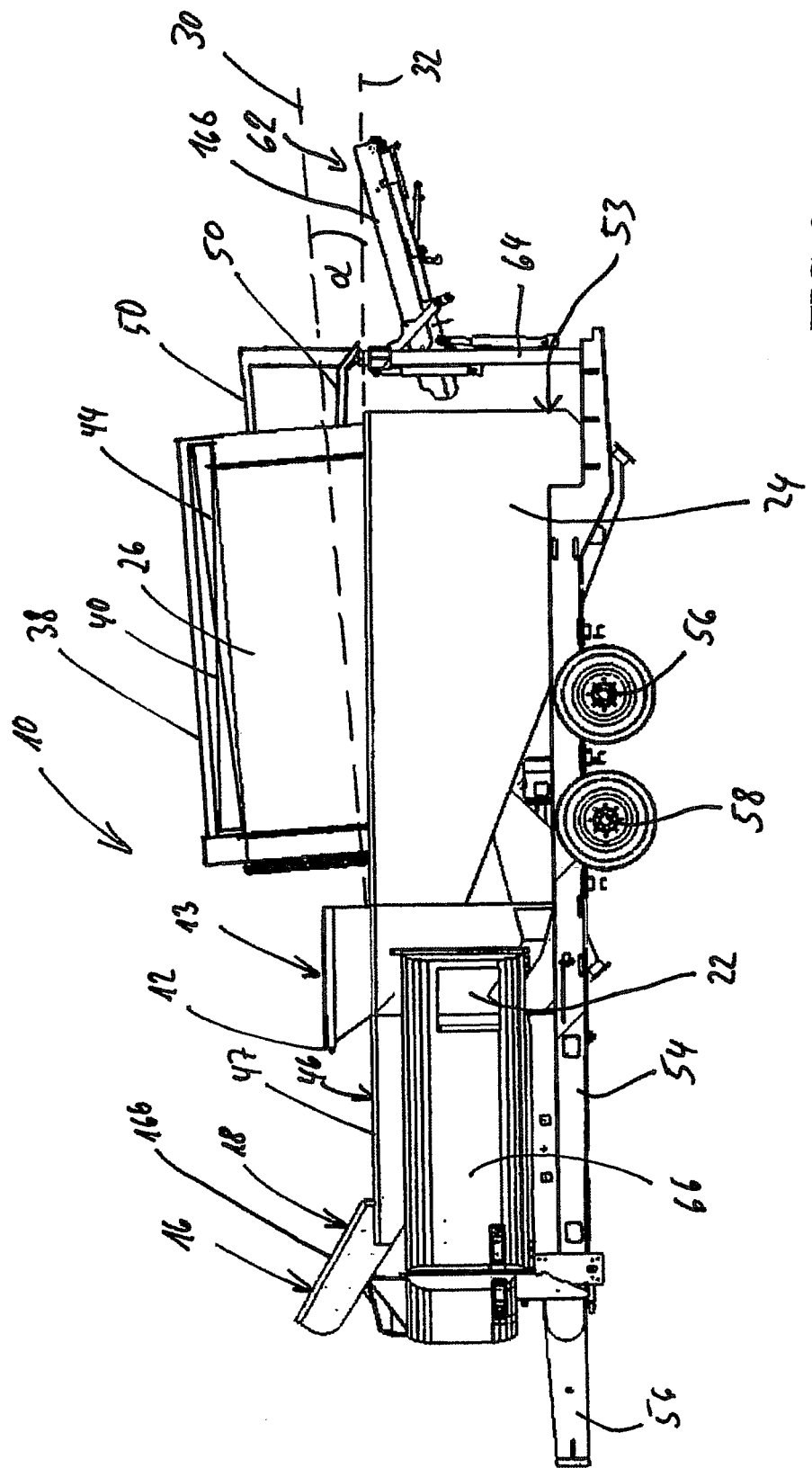
FIG. 2 is a side view of the mobile cleaning apparatus according to FIG. 1.

In this exemplary embodiment of FIGS. 1 and 2, the cleaning apparatus 10 is configured as a mobile trailer 54 for a tractor unit. In doing so, it can be attached to a not shown tractor by a hook 56 and can be moved to the site of operation, for example a field. The cleaning apparatus 10 includes a frame on which two axles 58 with wheels 60 are mounted.

Furthermore, the conveyor belt segment 16*b* is formed as a discharge conveyor belt 62 via which the purified crops are transported, for example, on a truck for transport.

In FIG. 2, which shows the cleaning apparatus 10 according to FIG. 1 in a schematic side view, the transport paths of the crops on the conveyor device 18 are shown more clearly. So far as components correspond with FIG. 1, the same reference numerals are used here. The conveyor device 18 shows the three conveyor belt segments 16*a* and 16*b* for transporting the crops. The first conveyor belt segment 16*a* brings the crops from below the opening of the charging and supply hopper 12. From there, the crops are transported into the screen drum 26 with an acute angle. The screen drum 26 extends through the cleaning region 20 at an acute angle α for cleaning the crops. The inclination of the screen drum 26 is adjustable for adaption to the size and the weight of the crops. In the cleaning region 20, the screen drum 26 is brushed with the brush rollers 40 for cleaning. The crops are blasted with high-pressure water jets by the spraying device 50. Finally, the conveyor belt segment 16*b* carries the crops out of this portion of the cleaning region 20 and, for instance, into a truck.

Water connections 64 are provided for the high-pressure nozzles 52 of the spraying device 50. The used water is treated in a water treatment system 66 and fed back to the cleaning system. This results in a closed water cycle reducing water consumption.

What is claimed is:

1. A cleaning apparatus for cleaning crops, such as potatoes or beets, on which soil and the like adhere, comprising:
    a charging and/or supply hopper with an opening at its underside from which the crops enter for cleaning,
    a housing with a cleaning region, in which the crops are cleaned,
    a water-filled cleaning basin through which the crops are transported by a conveyor belt for cleaning; and
    a rotating screen drum rotating about an axis of rotation in which the crops are cleaned, wherein the screen drum is arranged in said cleaning region,
    wherein the axis of rotation of said rotating screen drum is inclined at an acute angle.

2. A cleaning apparatus for cleaning crops according to claim 1, wherein transport means is provided for the movement of the crops in said screen drum.

3. A cleaning apparatus for cleaning crops according to claim 2, wherein said transport means in said screen drum is configured as helical guides.

4. A cleaning apparatus for cleaning crops according to claim 1, wherein the inclination of said axis of rotation of said rotating screen drum is variably adjustable.

5. A cleaning apparatus for cleaning crops according to claim 1, wherein brush means is provided, the brush means comprises a brush roller.

6. A cleaning apparatus for cleaning crops according to claim 1, wherein a spraying device with one or more high-pressure nozzles is provided in said cleaning region, which cleans the crops with water under high pressure.

7. A cleaning apparatus for cleaning crops according to claim 6, wherein said spraying device comprises a pivotable pressure nozzle, which cleans the crops with water under high pressure.

8. A cleaning apparatus for cleaning crops according to claim 1, wherein a shaker device is provided for shaking the crops.

9. A cleaning apparatus for cleaning crops according to claim 1, wherein a screen is provided for screening soil and the like.

10. A cleaning apparatus for cleaning crops according to claim 1, wherein the cleaning apparatus is adapted as a mobile trailer for a tractor unit.

11. A cleaning apparatus for cleaning crops according to claim 1, wherein said screen drum is arranged above a water collecting basin.

* * * * *